United States Patent Office 3,749,715
Patented July 31, 1973

3,749,715
METHOD OF PREPARING 2,3-DIHYDRO-1H-PYRIDO-[2,3-b][1,4]-THIAZIN-2-ONES
Robert George Stein, Kenosha, Wis., and Carl William Nordeen, McHenry, Ill., assignors to Abbott Laboratories, North Chicago, Ill.
No Drawing. Filed Jan. 20, 1971, Ser. No. 108,206
Int. Cl. C07c 93/12
U.S. Cl. 260—243 R    3 Claims

ABSTRACT OF THE DISCLOSURE

An improved method of preparing 2,3-dihydro - 1H-pyrido-[2,3-b][1,4]thiazin - 2 - ones by reacting an appropriate 2-mercapto - 3 - nitropyridine with an appropriately substituted haloacetic acid moiety.

---

The invention relates to an improved process for preparing 2,3-dihydro-1H-pyrido-[2,3-b][1,4]thiazines.

2,3 - dihydro - 1H - pyrido - [2,3-b][1,4]thiazines of the formula

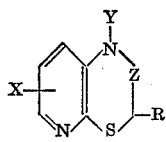

wherein Z is a methylene or carbonyl group, R and X each represents hydrogen or methyl and Y is hydrogen, methyl, propargyl or 1-dimethylamino - 2 - propyl, and the acid addition salts thereof, are disclosed in U.S. Pat. No. 3,546,220. The compounds exhibit and anti-inflammatory activity.

In U.S. 3,546,220, compounds wherein Z is carbonyl are prepared from 2-chloro - 3 - nitropyridine which may further be substituted in the 4-, 5- and 6-position by a methyl group. While the compounds can be prepared in fair yields from the 2-chloro - 3 - nitropyridine, it has now been found that more favorable reaction conditions are provided when a 2-mercapto-3-nitropyridine of the formula

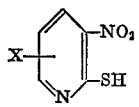

wherein X is hydrogen or methyl is reacted with a haloacetic acid moiety of the formula

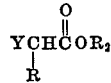

wherein Y is bromo, chloro, fluoro or iodo, preferably bromo, R is hydrogen or methyl, and $R_2$ is hydrogen, methyl or ethyl.

The 2-mercapto - 3 - nitropyridine starting material can be prepared according to the method described in J. Pharm. Soc. Japan 64, 201-2 (1944). The haloacetic acid moieties are commercially available.

The following example further illustrates the present invention.

Preparation of 2,3-dihydro-1H-pyrido-[2,3-b][1,4]thiazin-2-one

Potassium hydroxide pellets (12.32 g.) were dissolved in 100 ml. of water and 15.6 g. of 2-mercapto-3-nitropyridine was added thereto with stirring, and the solution was stirred for 30 minutes. A solution of 13.9 g. of bromoacetic acid in 100 ml. of water was then added and the reaction was stirred at room temperature overnight. The reaction was filtered to remove the insoluble material, made acidic with glacial acetic acid and the resulting precipitate was filtered, washed three times with water and dried to yield 12.4 g. of 3-nitro-2-pyridylmercapto actic acid, M.P. 161–163° (dec.). The material was recrystallized from water using Darco, filtered and dried to yield 10.88 g. of the intermediate, M.P. 161–163° (dec.).

Analysis.—Calcd. for $C_7H_6N_2O_4S$ (percent): C, 39.25; H, 2.80; N, 13.08. Found (percent): C, 39.11; H, 2.95; N, 13.07.

The intermediate is then dissolved in 300 ml. of 2-methoxyethanol and hydrogenated in a Parr Shaker in the presence of Raney Nickel at 2 to 3 atm. hydrogen according to the method described in Example 1, lines 20–30 of U.S. Pat. 3,546,220 to yield 2,3-dihydro-1H-pyrido-[2,3-b][1,4]thiazin-2-one, M.P. 209–211° C.

The alkylation step can be carried out in a number of formamide, dimethylsulfoxide, acetonitrile and $C_1$–$C_7$ alkyl alcohols. The reaction is generally carried out at temperatures of from 50 to 185° C. for from 1 to 24 hours.

We claim:
1. A process for preparing compounds of the formula

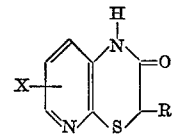

wherein R and X each represent hydrogen or methyl, comprising the steps of reacting a 2-mercapto-3-nitropyridine of the formula

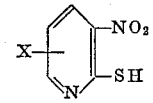

wherein X is hydrogen or methyl, with a haloacetic acid moiety of the formula

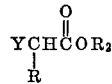

wherein Y is bromo, chloro, fluoro or iodo, R is hydrogen or methyl and $R_2$ is hydrogen, methyl or ethyl, in the presence of a suitable solvent to yield a 3-nitropyridinyl-2-thioacetic acid moiety of the formula

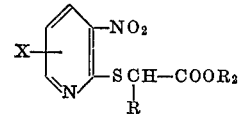

wherein X, R and $R_2$ are as defined above, and hydrogenating the resulting thioacetic acid moiety.

2. A process in accordance with claim 1 wherein Y is bromo.

3. A process in accordance with claim 1 wherein the 2-mercapto - 3 - nitropyridine and the haloacetic acid are reacted at temperatures of from 50–185° C. for from 1 to 24 hours.

References Cited

UNITED STATES PATENTS

| | | | |
|---|---|---|---|
| 3,080,364 | 3/1963 | Schroeder | 260—243 |
| 3,546,220 | 12/1970 | Stein et al. | 260—243 |

JOHN M. FORD, Primary Examiner

U.S. Cl. X.R.
424—246